(12) United States Patent
Tsai

(10) Patent No.: US 7,832,358 B2
(45) Date of Patent: Nov. 16, 2010

(54) FILTER DEVICE FOR AQUARIUM

(76) Inventor: Hsueh-Lee Tsai, 1F, No. 55, Jenyi Road, Huwei Town, Yunlin Hsien (TW) 63244

( * ) Notice: Subject to any disclaimer, the term of this patent is extended or adjusted under 35 U.S.C. 154(b) by 247 days.

(21) Appl. No.: 12/082,929

(22) Filed: Apr. 14, 2008

(65) Prior Publication Data
US 2009/0255480 A1  Oct. 15, 2009

(51) Int. Cl.
*A01K 63/04* (2006.01)
(52) U.S. Cl. .................. 119/259; 119/261
(58) Field of Classification Search ......... 119/259–261, 119/245, 257; *A01K 63/00, 63/04*
See application file for complete search history.

(56) References Cited

U.S. PATENT DOCUMENTS

| | | | |
|---|---|---|---|
| 3,151,069 A | 9/1964 | Halpert | |
| 3,512,646 A * | 5/1970 | Willinger | 210/167.21 |
| 3,630,367 A | 12/1971 | Willinger | 210/169 |
| 4,978,444 A | 12/1990 | Rommel | 210/169 |
| 5,059,315 A | 10/1991 | Senape | 210/169 |
| 5,062,951 A * | 11/1991 | Tominaga | 210/167.23 |
| 5,474,673 A * | 12/1995 | Ludlow | 210/151 |
| 6,666,168 B2 * | 12/2003 | Stutz et al. | 119/259 |
| 2007/0023338 A1 * | 2/2007 | Newman | 210/167.21 |
| 2007/0262008 A1 * | 11/2007 | Mihlbauer et al. | 210/167.27 |
| 2009/0126645 A1 * | 5/2009 | Tsai | 119/261 |

FOREIGN PATENT DOCUMENTS

| | | | |
|---|---|---|---|
| JP | 09038637 A | * | 2/1997 |
| JP | 2003000096 A | * | 1/2003 |

* cited by examiner

*Primary Examiner*—Son T Nguyen
*Assistant Examiner*—Shadi Baniani
(74) *Attorney, Agent, or Firm*—Charles E. Baxley

(57) ABSTRACT

An aquarium includes a filter housing disposed in a container, the housing includes a number of spaced guide fins extended into the housing and arranged to form a peripheral passage around the guide fins, a filter member engaged in the guide fins, and a water pump attached to the housing for pumping the water into the passage of the housing and for guiding the water to flow through the guide fins and to flow from various directions into the filter member and for allowing the water to be guided to flow through an outer peripheral portion of the filter member and for preventing the water from flowing through only a small portion of the filter member and for preventing the filter member from being quickly blocked by dirt or contaminant.

5 Claims, 5 Drawing Sheets

FILTER DEVICE FOR AQUARIUM

BACKGROUND OF THE INVENTION

1. Field of the Invention

The present invention relates to an aquarium, and more particularly to an aquarium including a filter device for guiding the water to flow from various directions into and through the filter members and for preventing the filter members from being blocked by the dirt and the contaminant.

2. Description of the Prior Art

Typical aquariums comprise a filter device disposed within the outer container of the aquarium, and including a filter member disposed within the filter device for filtering the dirt and the contaminant.

For example, U.S. Pat. No. 3,151,069 to Halpert discloses one of the typical aquariums also comprising a filter housing disposed in a water tank, and including one or more filter members disposed within the filter housing, and a divider tube for guiding the water to flow through the filter members.

Normally, the water is guided to flow from the upper portion through the filter members and to allow the filtered or clean water to flow out through the lower portion or the other portions of the filter members.

However, the water may only be guided to flow through the filter members unidirectionally or to flow one way through the filter members, such that the upper portion of the filter members may be easily and quickly blocked by the dirt and the contaminant and may be become failed shortly.

U.S. Pat. No. 3,630,367 to Willinger discloses another typical aquarium also comprising one or more filter members or filter elements disposed within a filtering compartment of a filter housing, and the water also may only be guided to flow to the upper portion of the filter members and then to flow through the filter members.

However, similarly, the water may only be guided to flow through the filter members unidirectionally or to flow one way through the filter members, such that the upper portion of the filter members may be easily and quickly blocked by the dirt and the contaminant and may be become failed shortly.

U.S. Pat. No. 4,978,444 to Rommel discloses a further typical aquarium also comprising one or more filter members disposed on a layer of pebbles, and the water also may only be guided to flow from the upper portion of the filter members and then to flow through the filter members.

However, similarly, the water may only be guided to flow through the filter members unidirectionally or to flow one way through the filter members, such that the upper portion of the filter members may be easily and quickly blocked by the dirt and the contaminant and may be become failed shortly.

U.S. Pat. No. 5,059,315 to Senape discloses a still further typical aquarium also comprising one or more filter members or layers disposed within a filtering compartment of a filter housing, and the water also may only be guided to flow toward the upper portion of the filter members and then to flow through the filter members.

However, similarly, the water may only be guided to flow through the filter members unidirectionally or to flow one way through the filter members, such that the upper portion of the filter members may be easily and quickly blocked by the dirt and the contaminant and may be become failed shortly.

The present invention has arisen to mitigate and/or obviate the afore-described disadvantages of the conventional filter devices for the aquariums.

SUMMARY OF THE INVENTION

The primary objective of the present invention is to provide an aquarium including a filter device for guiding the water to flow from various directions into and through the filter members and for preventing the filter members from being blocked by the dirt and the contaminant.

In accordance with one aspect of the invention, there is provided an aquarium comprising a container including a chamber formed therein for receiving a water, a filter device including a housing disposed in the chamber of the container, the housing including a compartment formed therein and including a number of spaced guide fins extended into the compartment of the housing and arranged to form a peripheral passage around the guide fins, a first filter member engaged in the guide fins and arranged to have the guide fins disposed around the first filter member, and a water pump attached to the housing and including a mouth engaged into the peripheral passage around the guide fins for pumping the water to flow into the passage of the housing and for guiding the water to flow through the guide fins and to flow from various directions into the first filter member and for allowing the water to be guided to flow through an outer peripheral portion of the first filter member and for preventing the water from flowing through only a small portion of the first filter member and for preventing the first filter member from being blocked by the dirt.

The housing includes a number of spaced guide flaps extended into the compartment of the housing and located within the guide fins for forming a peripheral channel between the guide fins and the guide flaps and for receiving the first filter member which may be anchored between the guide fins and the guide flaps.

The housing includes a number of spaced bars extended into the compartment of the housing and located within the guide flaps for forming a peripheral path between the bars and the guide flaps and for receiving a second filter member.

The housing includes a number of posts extended into the compartment of the housing and located within the bars for forming a peripheral pathway between the bars and the posts and for receiving a filter element which may include the other filter materials, such as biochemistry materials, infrared materials, or the like for further filtering the water.

The housing includes a conduit formed within the posts, and includes a face board having an outlet aligned with the conduit of the housing for allowing the water to flow from the conduit and to flow out through the outlet of the housing and to flow into the chamber of the container.

The housing includes an upper board and includes a plate spaced from the upper board for forming a chamber between the plate and the upper board, and the plate is spaced from the face board for allowing the water in the compartment of the housing to flow upwardly into the chamber of the housing when the first filter member is blocked by the dirt.

The housing includes a number of apertures formed in the face board and communicating with the chamber of the housing for allowing the water to flow from the chamber between the plate and the upper board of the housing and to flow into the chamber of the container.

The housing includes a partition for forming the compartment in the housing, and includes a side board disposed beside the partition for forming a space between the partition and the side board and for receiving the water pump.

The housing includes a number of openings formed in the face board and communicating with the space of the housing for allowing the water to flow from the chamber of the container into the space of the housing. The housing includes an inlet formed in the face board and communicating with the space of the housing for allowing the water to be pumped from the chamber of the container into the space of the housing.

The container includes two slots oppositely formed in the two side portions and communicating with the chamber of the container, and the face board includes two side edges engaged with the slots of the container for anchoring and securing the housing to the container.

The housing includes a face board having an outlet, a rotary guide member is rotatably attached to the face board and includes a number of perforations formed therein and offset from the outlet of the face board for preventing the water from directly flowing out through the perforations of the rotary guide member.

The housing includes a hub formed around the outlet of the face board, and the rotary guide member is rotatably attached to the face board with the hub. The housing includes a heater disposed therein for heating the water and for maintaining the water in a predetermined temperature.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
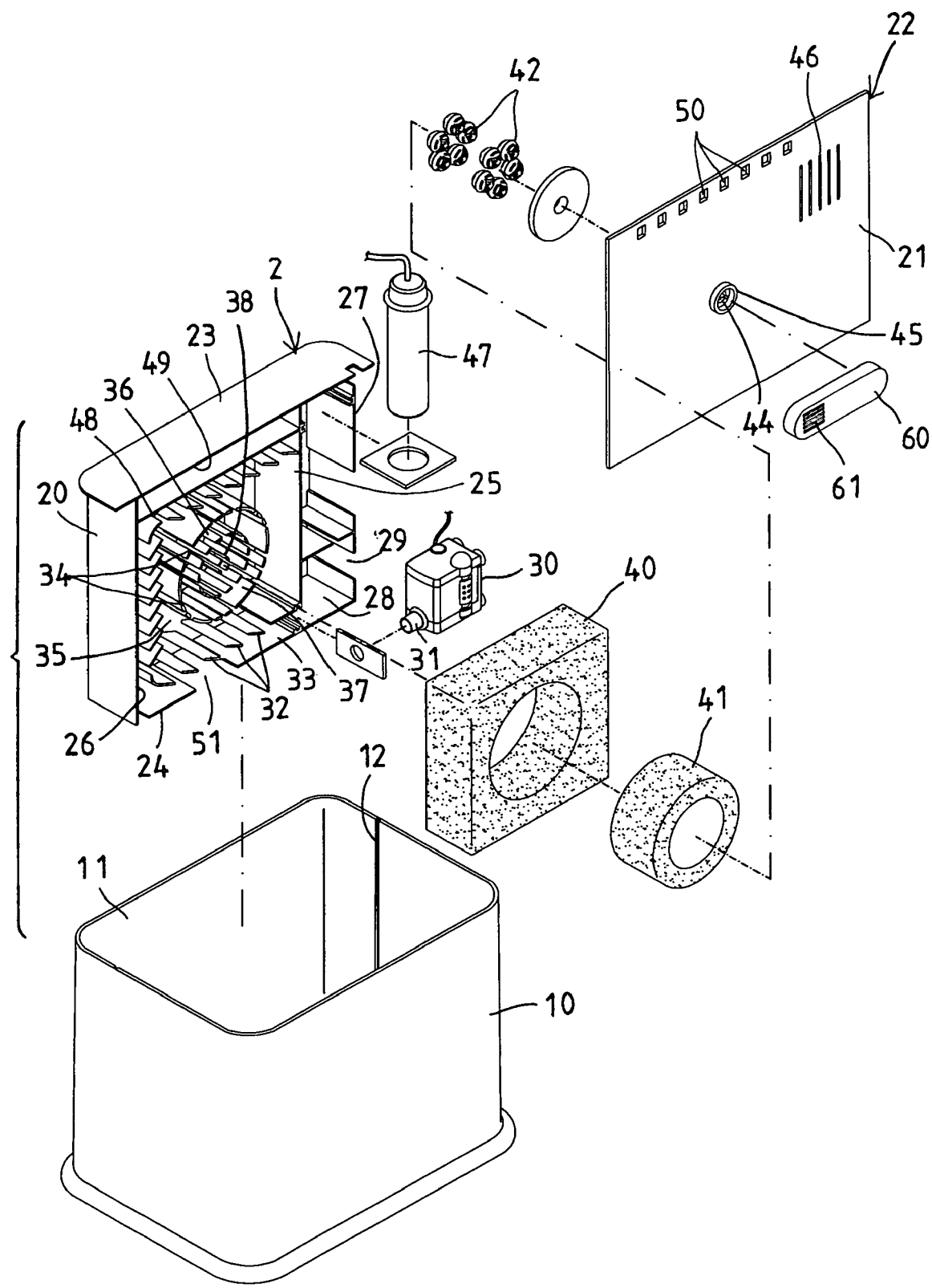
FIG. 1 is a partial exploded view of an aquarium in accordance with the present invention.
Figure 2:
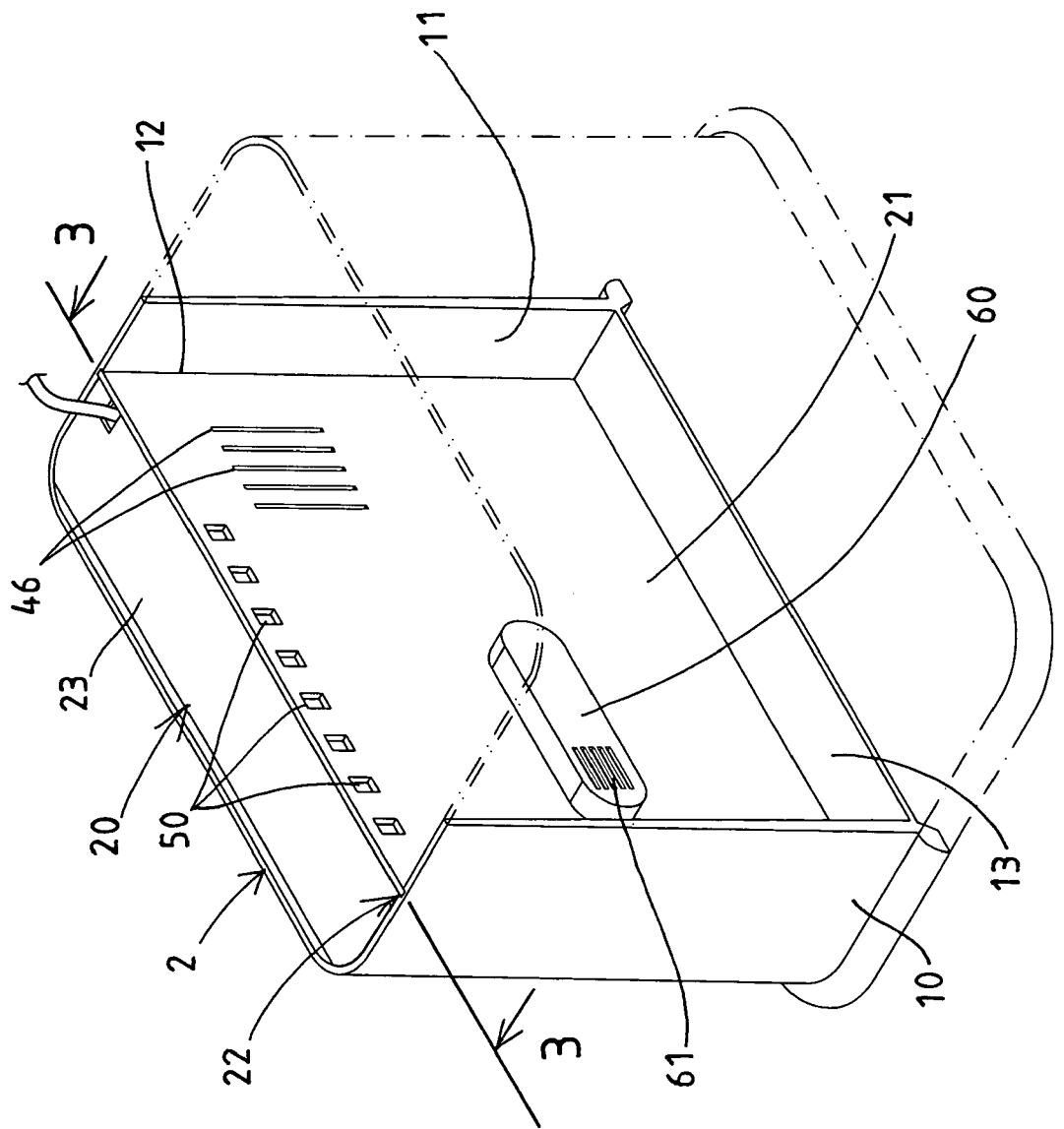
FIG. 2 is a perspective view of the aquarium, in which a portion of the aquarium has been cut off for showing an inner structure of the aquarium.
Figure 3:
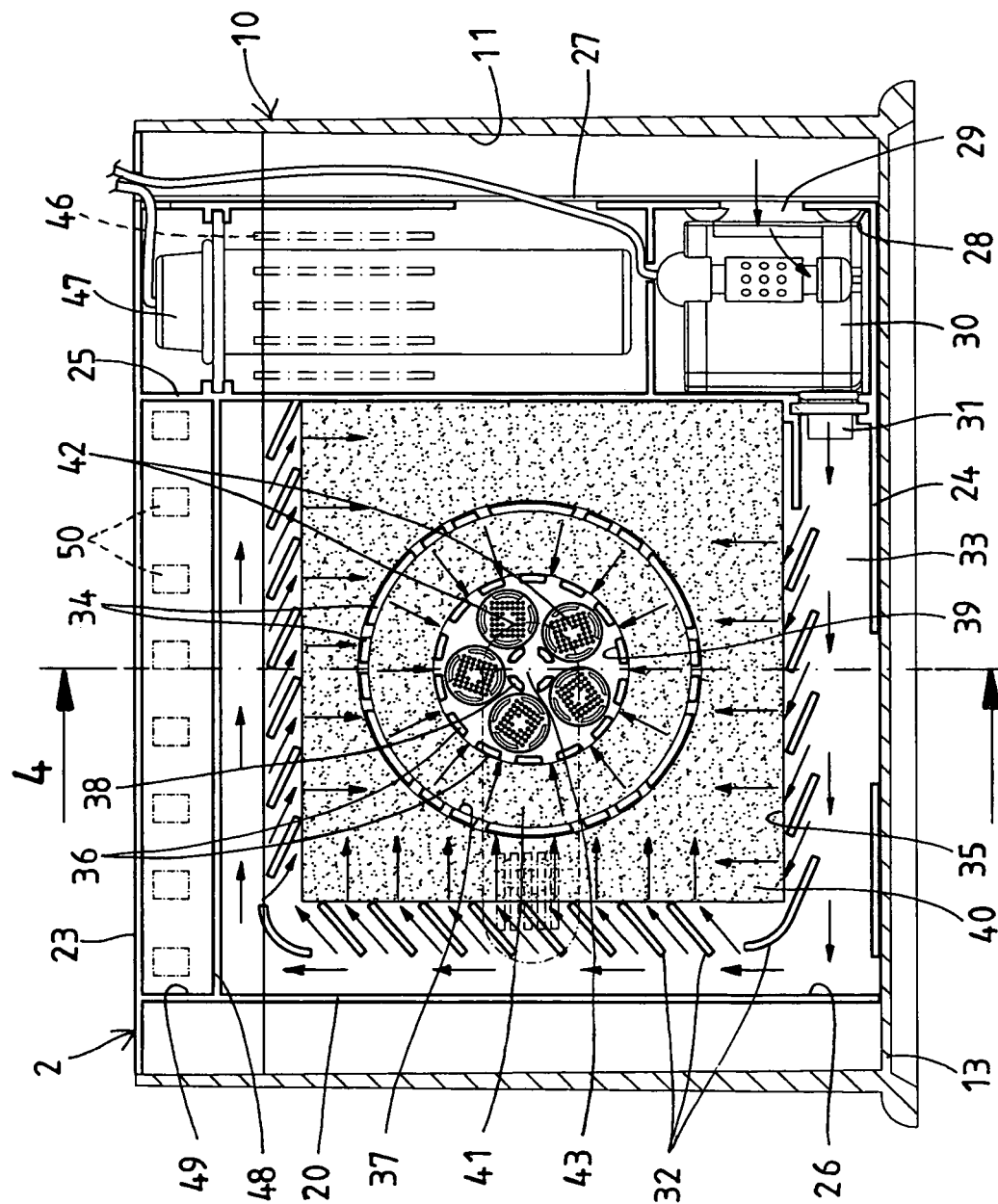
FIG. 3 is a cross sectional view of the aquarium taken along lines 3-3 of FIG. 2.
Figure 4:
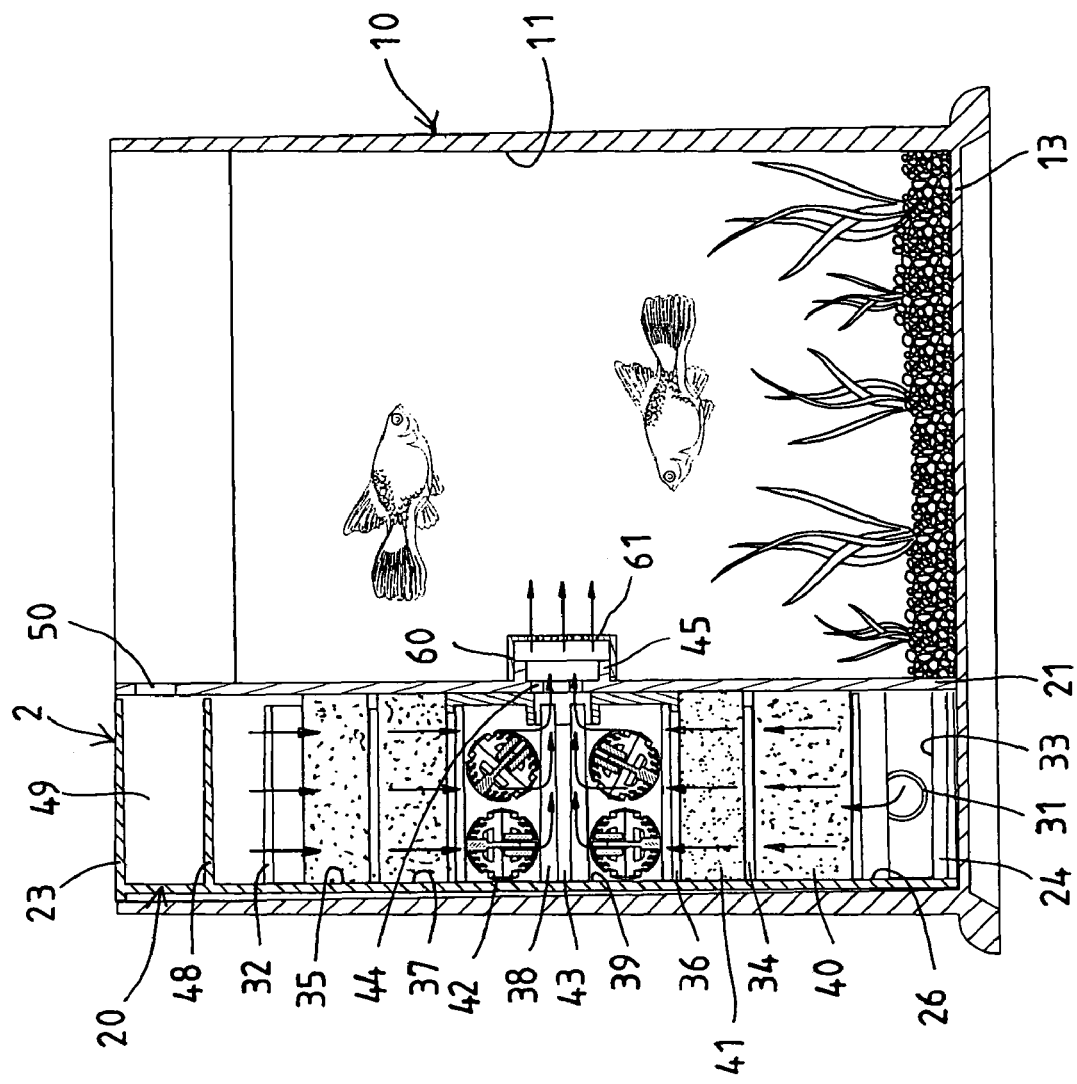
FIG. 4 is another cross sectional view of the aquarium taken along lines 4-4 of FIG. 3.
Figure 5:
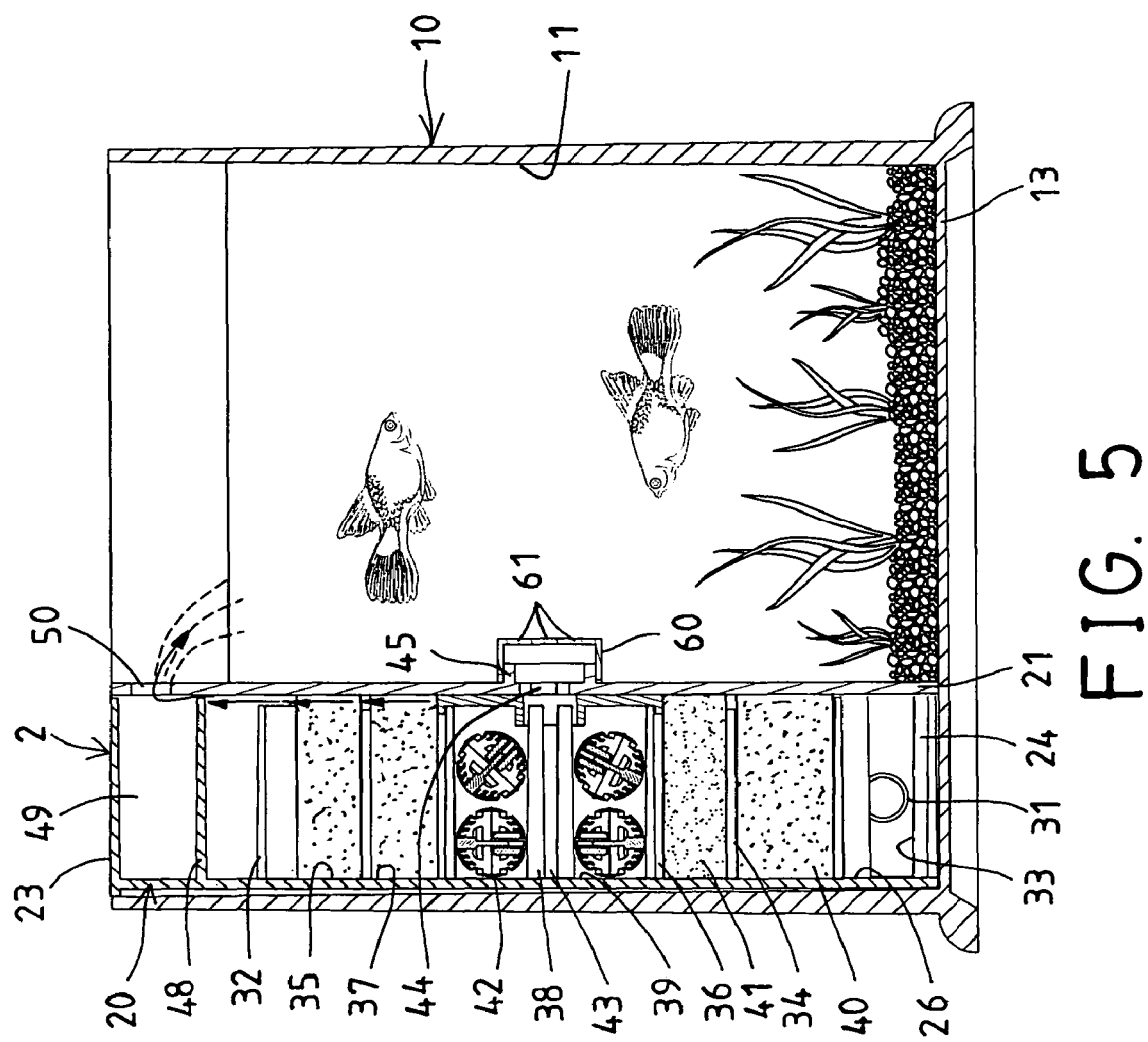
FIG. 5 is a cross sectional view similar to FIG. 4, illustrating the operation of the aquarium.

Referring to the drawings, and initially to FIGS. 1-4, an aquarium in accordance with the present invention comprises a water tank or a water or outer container 10 including a chamber 11 formed therein for receiving the water, and including two slots 12 oppositely formed in the container 10 and communicating with the chamber 11 of the container 10, and including a bottom wall 13 for forming or defining the chamber 11 of the container 10 and for receiving a filter device 2 which is preferably disposed in one side of the chamber 11 of the container 10, best shown in FIGS. 1 and 4-5.

The filter device 2 includes a housing 20 disposed in the chamber 11 of the container 10 and having a face board 21 which includes two side portions or side edges 22 engaged with the slots 12 of the container 10 for anchoring and securing the housing 20 to the container 10, and the housing 20 includes an upper board 23, a bottom board 24, and a partition 25 disposed in the housing 20, and preferably located closer to one side of the housing 20 for forming or defining a compartment 26 in the housing 20, and includes a side board 27 disposed beside the partition 25 and parallel to the partition 25 for forming or defining a space 28, and includes an inlet 29 formed in the side board 27 and communicating with the space 28 of the housing 20.

As shown in FIGS. 1 and 3, the inlet 29 of the housing 20 is also communicating with the chamber 11 of the container 10 for allowing the water in the chamber 11 of the container 10 to flow through the inlet 29 and to flow into the space 28 and the compartment 26 of the housing 20, and a pumping device or water pump 30 is disposed in the space 28 of the housing 20 and attached to the housing 20 and includes a mouth 31 extended or engaged into the compartment 26 of the housing 20 for pumping the water from the container 10 into the housing 20 and for supplying the water into the compartment 26 of the housing 20.

The housing 20 further includes a number of spaced guide fins 32 extended or engaged into the compartment 26 of the housing 20 and located in the outer peripheral portion of the compartment 26 of the housing 20 and arranged in a C-shape for forming or defining a C-shaped outer or peripheral passage 33 outside or around the guide fins 32, and includes a number of spaced guide flaps 34 extended or engaged into the compartment 26 of the housing 20 and located in the inner portion of the compartment 26 of the housing 20 and located within the guide fins 32, and arranged in an annular shape for forming or defining a peripheral channel 35 between the guide fins 32 and the guide flaps 34 and for receiving a filter member 40 which is engaged in the guide fins 32, and the guide fins 32 is disposed or arranged around the filter member 40. The mouth 31 of the water pump 30 is directed or engaged into the passage 33 of the housing 20.

The housing 20 further includes a number of spaced bars 36 extended or engaged into the compartment 26 of the housing 20 and located in the inner portion of the compartment 26 of the housing 20 and also located within the guide flaps 34 and preferably arranged in an annular shape for forming or defining an annular or peripheral path 37 between the guide flaps 34 and the bars 36 and for receiving another filter member 41, and further includes a number of spaced posts 38 extended or engaged into the compartment 26 of the housing 20 and located in the inner portion of the compartment 26 of the housing 20 and also arranged or located within the bars 36 and preferably arranged in an annular shape for forming or defining an annular or peripheral pathway 39 between the posts 38 and the bars 36 and for receiving one or more further filter members or elements 42.

The housing 20 further includes a conduit 43 formed within the posts 38, and further includes an outlet 44 formed in the face board 21 and aligned with the conduit 43 of the housing 20 for allowing the filtered water to flow out through the outlet 44 of the housing 20 and then to flow into the chamber 11 of the container 10 again, best shown in FIG. 4. The housing 20 further includes a hub 45 formed or provided around the outlet 44 of the face board 21, and includes a number of openings 46 formed in the face board 21 and communicating with the space 28 of the housing 20 and also for allowing the water to be pumped by the water pump 30. A heater 47 may be disposed in the space 28 of the housing 20 for heating the water and for maintaining the water in a predetermined or suitable temperature.

In operation, as shown in FIGS. 3 and 4, the water pump 30 may pump and propel the water to flow into the passage 33 of the housing 20, and the water may then be guided to flow through the gaps formed between the guide fins 32 and then to flow from various directions into the filter member 40 and thus for allowing the water to be guided to uniformly flow through the outer peripheral portion of the filter member 40 and thus for preventing the water from flowing through only a small portion or a limited portion of the filter member 40 and thus for preventing the filter member 40 from being easily and quickly blocked by the dirt and the contaminant.

The water may then be forced to flow through the gaps formed between the guide flaps 34 and then to flow from various directions into the other filter member 41 and thus for allowing the water to be guided to uniformly flow through the outer peripheral portion of the filter member 41 and thus for preventing the water from flowing through only a small portion or a limited portion of the filter member 41 and thus for preventing the filter member 41 from being easily and quickly blocked by the dirt and the contaminant. The water may then be forced to flow through the gaps formed between the bars 36 and then to flow from various directions into the filter elements 42, and then to flow into the conduit 43 and to flow out through the outlet 44 of the housing 20 and then to flow into the chamber 11 of the container 10.

The filter members 40, 41 and/or the filter elements 42 may be made of various filter materials, such as fibers, spongy materials, cottons, filter particles, or the like, and the filter elements 42 may further include the other filter materials, such as biochemistry materials, infrared materials, or the like for further filtering the water. It is to be noted that the guide fins 32 and the guide flaps 34 and the bars 36 may suitably guide the water to uniformly flow through the outer peripheral portion of the filter members 40, 41 and the filter elements 42 for preventing the filter members 40, 41 and the filter elements 42 from being easily and quickly blocked by the dirt and the contaminant.

The housing 20 further includes a plate 48 disposed in the upper portion of the compartment 26 of the housing 20 and spaced from the upper board 23 for forming or defining a chamber 49 in the upper portion of the housing 20, and the plate 48 is slightly spaced from the face board 21 (FIGS. 4, 5) for allowing the water in the compartment 26 of the housing 20 to flow upwardly into the upper chamber 49 of the housing 20 when or after the filter members 40, 41 and the filter elements 42 have been blocked by the dirt and the contaminant, the face board 21 includes a number of apertures 50 formed therein and communicating with the chamber 49 of the housing 20 for allowing the water to flow into the chamber 11 of the container 10 again. The housing 20 may includes an orifice 51 formed in the bottom board 24 (FIG. 1) for allowing the water to flow out of the housing 20 when the housing 20 is removed from the container 10.

A rotary guide member 60 may further be provided and rotatably attached or secured to the face board 21 with the hub 45 for allowing the rotary guide member 60 to be rotated relative to the hub 45 of the face board 21 of the housing 20, and the rotary guide member 60 includes a number of perforations 61 formed therein and offset from the outlet 44 and the hub 45 of the face board 21 of the housing 20 for preventing the water from directly flowing out through the perforations 61 of the rotary guide member 60, and the water may be arranged to propel or to rotate the rotary guide member 60 relative to the hub 45 of the face board 21 of the housing 20 for 360 degrees and thus for allowing the water to be guided to uniformly flow toward various directions of the chamber 11 of the container 10.

It is further to be noted that the typical aquariums failed to provide a number of spaced guide fins 32 extended into the compartment 26 of the housing 20 and located in the outer peripheral portion of the compartment 26 of the housing 20 and arranged to form an outer peripheral passage 33 around the guide fins 32 for guiding the water to flow through the gaps formed between the guide fins 32 and then to flow from various directions into the filter member 40 and thus for allowing the water to be guided to uniformly flow through the outer peripheral portion of the filter member 40 and thus for preventing the water from flowing through only a small portion or a limited portion of the filter member 40 and thus for preventing the filter member 40 from being easily and quickly blocked by the dirt and the contaminant and for increasing the working life of the filter members 40, 41 and the filter elements 42.

Accordingly, the aquarium in accordance with the present invention includes a filter device for guiding the water to flow from various directions into and through the filter members and for preventing the filter members from being blocked by the dirt and the contaminant.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An aquarium comprising:

a container including a chamber formed therein for receiving a water, a filter device including a housing disposed in said chamber of said container, said housing including a compartment formed therein and including a partition disposed in said housing for forming said compartment in said housing, and including a plurality of spaced guide fins extended into said compartment of said housing and arranged to form a peripheral passage around said guide fins, said housing including a plurality of spaced guide flaps extended into said compartment of said housing and located within said guide fins for forming a peripheral channel between said guide fins and said guide flaps, said housing including a plurality of spaced bars extended into said compartment of said housing and located within said guide flaps for forming a peripheral path between said bars and said guide flaps, said housing including a plurality of posts extended into said compartment of said housing and located within said bars for forming a peripheral pathway between said bars and said posts and including a conduit formed within said posts, said housing including a face board having an outlet aligned with said conduit of said housing for allowing the water to flow out through said outlet of said housing and to flow into said chamber of said container, said housing including an upper board and a plate spaced from said upper board for forming a chamber between said plate and said upper board, and said plate being spaced from said face board for allowing the water in said compartment of said housing to flow upwardly into said chamber of said housing when said first filter member is blocked by a dirt, said housing including a plurality of apertures formed in said face board and communicating with said chamber of said housing for allowing the water to flow from said housing into said chamber of said container, said housing including a side board disposed beside said partition for forming a space between said partition and said side board, said housing including a plurality of openings formed in said face board and communicating with said space of said housing for allowing the water to flow from said chamber of said container into said space of said housing, said housing including an inlet formed in said side board and communicating with said space of said housing, a first filter member engaged in said peripheral channel formed between said guide fins and said guide flaps, and arranged to have said guide fins disposed around said first filter member, a second filter member engaged in said peripheral path formed between said bars and said guide flaps, a filter element engaged in said peripheral path formed between said bars and said posts, and a water pump attached to said housing and received in said space between said partition and said side board, and including a mouth engaged into said peripheral passage around said guide fins for pumping the water to flow into said passage of said housing and for guiding the water to flow through said guide fins and to flow from various directions into said first filter member and for allowing the water to be guided to flow through an outer peripheral portion of said first filter member and for preventing the water from flowing through only a small portion of said first filter member and for preventing said first filter member from being blocked by the dirt.

2. The aquarium as claimed in claim 1, wherein said container includes two slots oppositely formed therein, said face board includes two side edges engaged with said slots of said container for anchoring and securing said housing to said container.

3. The aquarium as claimed in claim 1, wherein a rotary guide member is rotatably attached to said face board and includes a plurality of perforations formed therein and offset from said outlet of said face board for preventing the water from directly flowing out through said perforations of said rotary guide member.

4. The aquarium as claimed in claim 3, wherein said housing includes a hub formed around said outlet of said face board, and said rotary guide member is rotatably attached to said face board with said hub.

5. The aquarium as claimed in claim 1, wherein said housing includes a heater disposed therein for heating the water and for maintaining the water in a predetermined temperature.

\* \* \* \* \*